United States Patent
Asaoka et al.

(10) Patent No.: US 10,279,692 B2
(45) Date of Patent: *May 7, 2019

(54) ELECTRICITY SUPPLY DEVICE AND ELECTRICITY RECEPTION DEVICE

(71) Applicant: Panasonic Intellectual Property Management Co., Ltd., Osaka (JP)

(72) Inventors: Noriaki Asaoka, Kanagawa (JP); Osamu Ohashi, Osaka (JP); Tsuyoshi Nishio, Chiba (JP); Masayoshi Koizumi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,157

(22) Filed: Dec. 4, 2017

(65) Prior Publication Data

US 2018/0086214 A1 Mar. 29, 2018

Related U.S. Application Data

(63) Continuation of application No. 14/780,355, filed as application No. PCT/JP2014/001733 on Mar. 26, 2014, now Pat. No. 9,866,036.

(30) Foreign Application Priority Data

Mar. 29, 2013 (JP) .................................. 2013-071863

(51) Int. Cl.
*H02J 5/00* (2016.01)
*H02J 7/02* (2016.01)
(Continued)

(52) U.S. Cl.
CPC ......... *B60L 11/182* (2013.01); *B60L 11/1829* (2013.01); *B60L 11/1833* (2013.01);
(Continued)

(58) Field of Classification Search
CPC ......... B60L 5/005; B60L 11/182; H02J 5/005; H02J 7/025
(Continued)

(56) References Cited

U.S. PATENT DOCUMENTS 9,187,006 B2 * 11/2015 Chen .................... B60L 11/182
9,333,870 B2 * 5/2016 Kume ................... B60L 11/182
(Continued)

FOREIGN PATENT DOCUMENTS

| JP | 2010-88178 A | 4/2010 |
| JP | 2010-226945 A | 10/2010 |
| JP | 2011-182624 A | 9/2011 |

OTHER PUBLICATIONS

International Search Report for Application No. PCT/JP2014/001733 dated Apr. 22, 2014.

*Primary Examiner* — John W Poos
(74) *Attorney, Agent, or Firm* — Pearne & Gordon LLP

(57) ABSTRACT

The electricity supply device (100) supplies electricity using electromagnetic force and opposes an external electricity reception coil (153a). An electricity supply coil (102a) has a hollow section (102b), and has a spiral shape. A reader (103) has an antenna disposed in the projected space resulting from projecting the hollow section (102b) in the central axial direction of the electricity supply coil (102a) and at a position more separated from the electricity reception coil (153a) than the opposing surface that opposes the electricity reception coil (153a) and is of the electricity supply coil (102a), and ID data transmitted by an RF tag (154) installed proximally to the electricity reception coil (153a) is received (Continued)

and detected by the antenna. An electricity-supply-side control unit (104) determines the presence/absence of an electricity reception coil (153*a*) on the basis of the ID data detected by the reader (103).

16 Claims, 17 Drawing Sheets

(51) Int. Cl.

| | | |
|---|---|---|
| *H01F 38/14* | (2006.01) | |
| *H02J 50/10* | (2016.01) | |
| *H02J 50/12* | (2016.01) | |
| *H02J 50/70* | (2016.01) | |
| *H02J 50/80* | (2016.01) | |
| *H02J 50/90* | (2016.01) | |
| *B60L 11/18* | (2006.01) | |
| *H02J 17/00* | (2006.01) | |

(52) U.S. Cl.
CPC ....... *B60L 11/1838* (2013.01); *B60L 11/1846* (2013.01); *H01F 38/14* (2013.01); *H02J 5/005* (2013.01); *H02J 7/025* (2013.01); *H02J 17/00* (2013.01); *H02J 50/10* (2016.02); *H02J 50/12* (2016.02); *H02J 50/70* (2016.02); *H02J 50/80* (2016.02); *H02J 50/90* (2016.02); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC .......................................................... 307/104
See application file for complete search history.

(56) References Cited

U.S. PATENT DOCUMENTS

| | | | | |
|---|---|---|---|---|
| 2010/0097186 | A1* | 4/2010 | Wielebski | G05B 19/409 340/10.1 |
| 2010/0185353 | A1* | 7/2010 | Barwick | B60K 17/30 701/23 |
| 2010/0225271 | A1* | 9/2010 | Oyobe | B60L 5/005 320/108 |
| 2011/0304458 | A1* | 12/2011 | Sayegh | G08B 13/2474 340/568.8 |
| 2012/0200151 | A1* | 8/2012 | Obayashi | B60L 11/123 307/9.1 |
| 2013/0015960 | A1* | 1/2013 | Kaga | G06K 19/07749 340/10.51 |
| 2013/0037365 | A1* | 2/2013 | Ichikawa | B60L 11/123 191/10 |
| 2013/0038272 | A1* | 2/2013 | Sagata | B60L 11/182 320/106 |
| 2014/0092236 | A1* | 4/2014 | Findeisen | G06K 9/00791 348/118 |
| 2014/0174870 | A1* | 6/2014 | Niizuma | H02J 5/005 191/10 |
| 2014/0191586 | A1* | 7/2014 | Ichikawa | H01F 38/14 307/104 |
| 2014/0333128 | A1* | 11/2014 | Ichikawa | H02J 7/025 307/9.1 |
| 2014/0354041 | A1* | 12/2014 | Yoshi | H02J 7/025 307/9.1 |
| 2015/0048688 | A1* | 2/2015 | Yamakawa | H02J 7/02 307/104 |

* cited by examiner

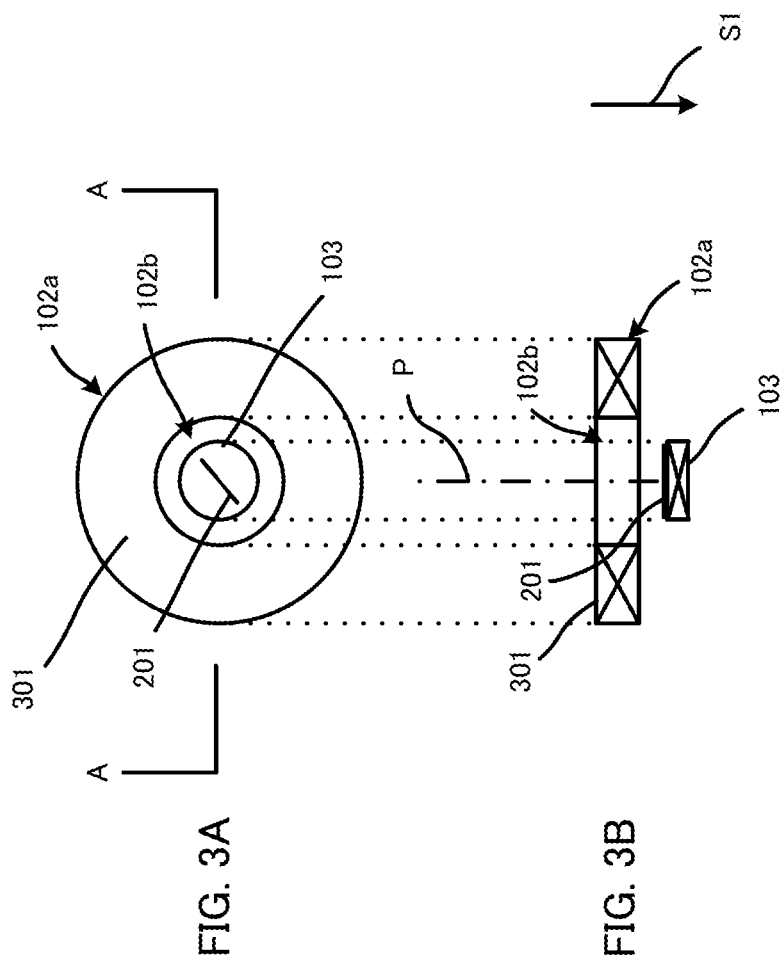

ELECTRICITY SUPPLY DEVICE AND ELECTRICITY RECEPTION DEVICE

TECHNICAL FIELD

The present invention relates to a power supply apparatus and a power receiving apparatus for transmitting and receiving power in a wireless manner.

BACKGROUND ART

Conventionally, there has been known a wireless charging system that charges a storage battery mounted on a vehicle using a power supply apparatus on the ground. In the wireless charging system, when power is supplied without a power supply coil and a power receiving coil being precisely positioned, a leakage magnetic field and unnecessary radiation increase. In this case, there is a problem of not being able to secure safety, for example, due to the malfunction of a pacemaker caused thereby.

For the problem mentioned above, there has been known a wireless charging system that starts charging after guiding a vehicle to a power supply section (e.g., Patent Literature (hereinafter, referred to as "PTL 1")). PTL 1 discloses that, when a vehicle is driven for parking at a position where a power receiving section of the vehicle faces a power supply section on the ground, the image of a positioning marker at the rear of a parking space is picked up with an onboard camera and the picked-up image is displayed on a display section to thereby guide the vehicle to the most appropriate position. A transmission section at the rear of the parking space transmits a reference position signal after the parking of the vehicle. Then, the power supply section starts supplying power when the reception level of the reference position signal received by a reception section of the vehicle is equal to or greater than a predetermined level.

CITATION LIST

Patent Literature

PTL 1
Japanese Patent Application Laid-Open No. 2010-226945

SUMMARY OF INVENTION

Technical Problem

In PTL 1, however, when a vehicle is parked obliquely relative to the parking space with the power receiving section and the power supply section facing each other, the reception section has a low reception level at the time of receiving the reference position signal from the transmission section at the rear of the parking space, and therefore the vehicle is not considered to be parked at the most appropriate position, making it impossible to start power supply.

An object of the present invention is to provide a power supply apparatus and a power receiving apparatus capable of detecting that a power supply section and a power receiving section face each other, irrespective of the state of a stopped vehicle.

Solution to Problem

The power supply apparatus of the present invention is a power supply apparatus that faces a power receiving coil located externally and that supplies power using an electromagnetic force, the apparatus including a spiral power supply coil that has a first hollow portion, a communication section that has an antenna disposed inside a projection space of the first hollow portion projected in a central axis direction of the power supply coil, the antenna being disposed at a position farther away from the power receiving coil than a facing surface of the power supply coil, the facing surface being a surface where the power supply coil faces the power receiving coil, the communication section receiving, via the antenna, and detecting an electromagnetic wave transmitted by a radio tag installed near the power receiving coil, and a control section that determines the presence or absence of the power receiving coil based on the electromagnetic wave detected by the communication section.

The power receiving apparatus of the present invention is a power receiving apparatus that faces a power supply coil located externally and that receives power using an electromagnetic force, the apparatus including a spiral power receiving coil having a first hollow portion, and a radio tag disposed inside a projection space of the first hollow portion projected in a central axis direction of the power supply coil, the radio tag being disposed at a position farther away from the power receiving coil than a facing surface of the power supply coil, the facing surface being a surface where the power supply coil faces the power receiving coil, the radio tag transmitting an electromagnetic wave for detecting that the power supply coil and the power receiving coil face each other to a communication section provided for the power supply coil.

Advantageous Effects of Invention

According to the present invention, it is possible to detect that a power supply section and a power receiving section face each other, irrespective of the state of a stopped vehicle.

BRIEF DESCRIPTION OF DRAWINGS

FIGS. 3A and 3B are diagrams illustrating the relative position between a power supply coil and the reader in Embodiment 1 of the present invention;

DESCRIPTION OF EMBODIMENTS

Hereinafter, embodiments of the present invention will be described in detail with reference to the drawings.

Embodiment 1

<Configuration of Power Supply System>

The configuration of power supply system 10 in Embodiment 1 of the present invention will be described using FIG. 1.

Power supply system 10 is mainly composed of power supply apparatus 100 and vehicle 150.

Figure 1:
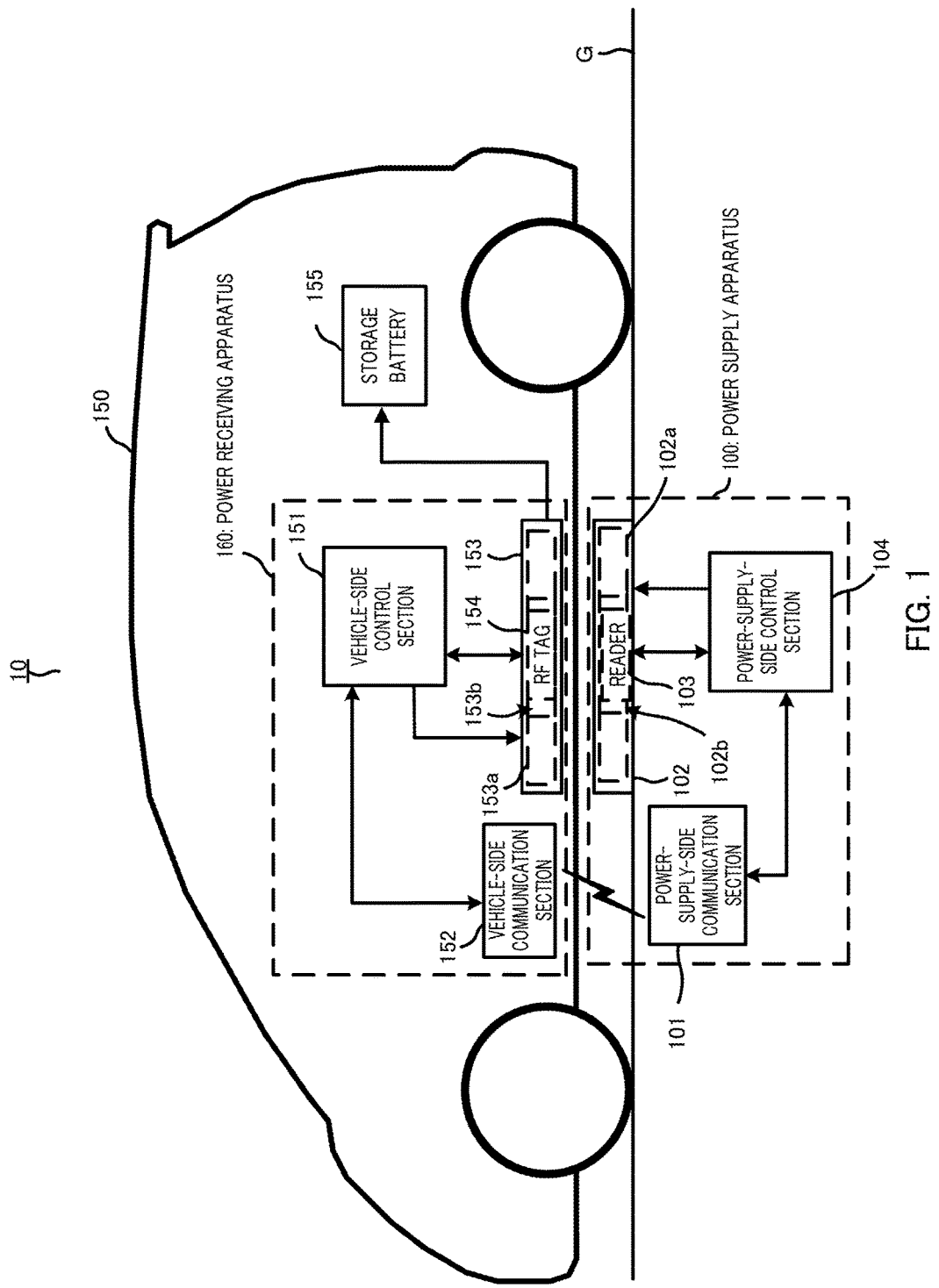
FIG. 1 is a block diagram illustrating the configuration of a power supply system according to Embodiment 1 of the present invention.

It is noted that FIG. 1 illustrates the state capable of supplying power, in which power supply section 102 and power receiving section 153 face each other.

Power supply apparatus 100 is installed on or buried in the ground so that power supply section 102 is exposed from ground G. Power supply apparatus 100 is provided, for example, in a parking space, and faces power receiving section 153 of vehicle 150 to supply power using an electromagnetic force during the parking of vehicle 150. It is noted that the configuration of power supply apparatus 100 will be described hereinafter.

Here, the phrase "power supply section 102 and power receiving section 153 face each other" means that power supply section 102 and power receiving section 153 face each other at a position where power can be supplied with predetermined or higher power supply efficiency. Specifically, it means that power supply coil 102a and power receiving coil 153a face each other at a position where power can be supplied with predetermined or higher power supply efficiency.

Vehicle 150 is, for example, an automobile which runs on power of storage battery 155, such as Plug-in Hybrid Electric Vehicle (PHEV) or Electric Vehicle (EV). It is noted that the detailed configuration of vehicle 150 will be described hereinafter.

<Configuration of Vehicle>

The configuration of vehicle 150 in Embodiment 1 of the present invention will be described using FIG. 1.

Vehicle 150 is mainly composed of storage battery 155 and power receiving apparatus 160.

Storage battery 155 stores power supplied from power supply apparatus 100 through power receiving apparatus 160.

Power receiving apparatus 160 supplies the power supplied from power supply apparatus 100 to storage battery 155. It is noted that the detailed configuration of power receiving apparatus 160 will be described hereinafter.

<Configuration of Power Supply Apparatus>

The configuration of power supply apparatus 100 according to Embodiment 1 of the present invention will be described using FIG. 1.

Power supply apparatus 100 is mainly composed of power-supply-side communication section 101, power supply section 102, reader 103, and power-supply-side control section 104.

Power-supply-side communication section 101 receives a power supply permission signal or power supply non-permission signal from vehicle-side communication section 152. Power-supply-side communication section 101 outputs the received power supply permission signal or power supply non-permission signal to power-supply-side control section 104. Power-supply-side communication section 101 transmits, to vehicle-side communication section 152, a detection result which indicates that RF tag 154 and an antenna of reader 103 face each other, and which has been received from power-supply-side control section 104.

Power supply section 102 has spiral power supply coil 102a. Power supply coil 102a is, for example, a planar spiral coil. Power supply coil 102a has hollow portion 102b. Power supply coil 102a supplies power to power receiving coil 153a facing power supply coil 102a, in accordance with the control of power-supply-side control section 104. Power supply coil 102a supplies power, for example, by an electromagnetic induction system or a magnetic resonance system (also referred to as magnetic field resonance system).

Reader 103 is disposed at a position farther away from power receiving coil 153a than a surface of power supply coil 102a where power supply coil 102a faces power receiving coil 153a (hereinafter, this surface is referred to as "facing surface"), such that an antenna (omitted in FIG. 1) is positioned at the center of hollow portion 102b of power supply coil 102a. Reader 103 detects whether or not it faces RF tag 154 by communicating with RF tag 154. It is noted that the configuration and the disposition of reader 103 will be described hereinafter. The present embodiment takes an example of employing a single antenna for reader 103.

When a power supply permission signal is input from power-supply-side communication section 101, and when a detection result indicating that reader 103 and RF tag 154 face each other is input from reader 103, power-supply-side control section 104 determines the presence of power receiving coil 153a to permit power supply, and controls power supply section 102 to start the power supply. At that time, power-supply-side control section 104 outputs, to power-supply-side communication section 101, a detection result indicating that RF tag 154 and the antenna of reader 103 face each other. When a power supply non-permission signal is input from power-supply-side communication section 101, or when the detection result of reader 103 facing RF tag 154 is not input from reader 103, power-supply-side control section 104 controls power supply section 102 not to start power supply or to stop power supply.

<Configuration of Power Receiving Apparatus>

The configuration of power receiving apparatus 160 according to Embodiment 1 of the present invention will be described using FIG. 1.

Power receiving apparatus 160 is mainly composed of vehicle-side control section 151, vehicle-side communication section 152, power receiving section 153, and RF tag 154.

Vehicle-side control section 151 controls vehicle-side communication section 152 and power receiving section 153 based on various input signals. When the detection result indicating that RF tag 154 and the antenna of reader 103 face each other is input from vehicle-side communication section 152, vehicle-side control section 151 controls power receiving section 153 to start receiving power. When the detection result indicating that RF tag 154 and the antenna of reader 103 face each other is not input from vehicle-side communication section 152, vehicle-side control section 151 controls power receiving section 153 not to start receiving power or to stop receiving power.

Vehicle-side communication section 152 generates a power supply permission signal that permits power supply or a power supply non-permission signal that does not permit power supply in accordance with the control of vehicle-side control section 151, and transmits the generated power supply permission signal or power supply non-permission signal to power supply apparatus 100. Vehicle-side communication section 152 outputs, to vehicle-side control section 151, a detection result indicating that RF tag 154 and the antenna of reader 103 face each other and received from power-supply-side communication section 101.

Power receiving section 153 has spiral power receiving coil 153a. Power receiving section 153 has hollow portion 153b. Power receiving coil 153a receives power from power supply coil 102a facing power receiving coil 153a. Power receiving section 153 supplies the power supplied to power receiving coil 153a to storage battery 155 in accordance with the control of vehicle-side control section 151. Power receiving section 153 is provided in such a state as to be exposed externally at the bottom of vehicle 150.

RF tag 154 is a radio tag, and is disposed at a position farther away from power supply coil 102a than a facing surface of power receiving coil 153a where power receiving coil 153a faces power supply coil 102a, and at the center of hollow portion 153b of power receiving coil 153a. It is noted that the disposition of RF tag 154 will be described hereinafter. The present embodiment takes an example of employing a single RF tag 154.

<Configuration of Reader>

Figure 2:
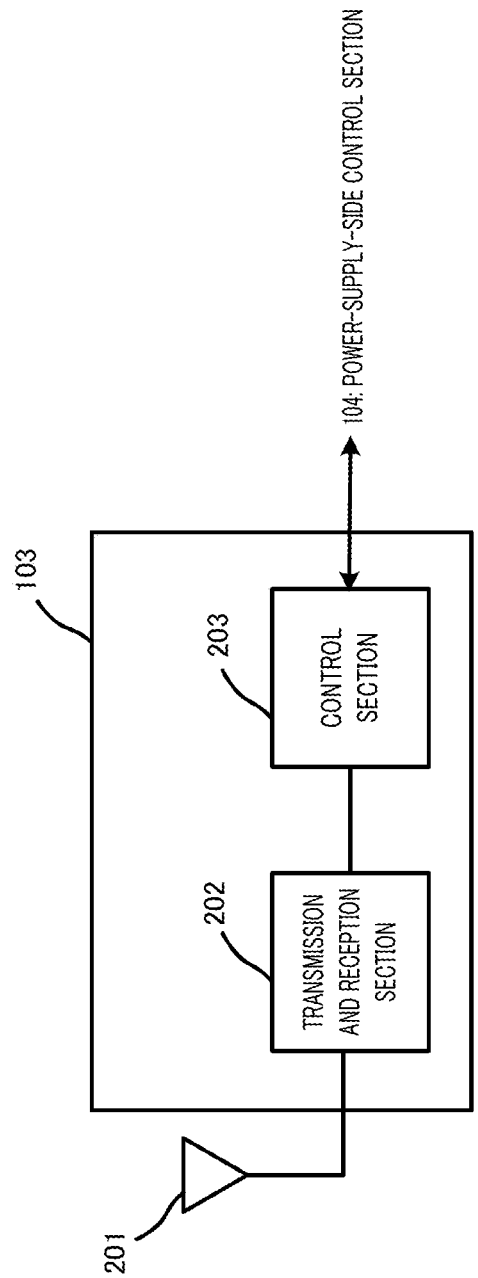
FIG. 2 is a block diagram illustrating the configuration of a reader in Embodiment 1 of the present invention.

The configuration of reader 103 in Embodiment 1 of the present invention will be described using FIG. 2.

Reader 103 is mainly composed of antenna 201, transmission and reception section 202, and control section 203.

Transmission and reception section 202 transmits a predetermined electromagnetic wave via antenna 201 in accordance with the control of control section 203. Transmission and reception section 202 outputs a signal received via antenna 201 to control section 203.

Control section 203 controls transmission and reception section 202 to transmit an electromagnetic wave in accordance with the control of power-supply-side control section 104. When a signal is input from transmission and reception section 202, control section 203 determines whether or not the signal is from RF tag 154. When the signal is from RF tag 154, control section 203 outputs, to power-supply-side control section 104, a detection result indicating that reader 103 and RF tag 154 face each other. Whether or not the signal is from RF tag 154 is determined by whether or not ID data unique to RF tag 154 is received.

<Disposition of Power Supply Coil and Reader>

The disposition of power supply coil 102a and reader 103 in Embodiment 1 of the present invention will be described using FIGS. 3A and 3B.

FIG. 3A is a plan view of power supply coil 102a and reader 103. FIG. 3B is a sectional view taken along line A-A of FIG. 3A.

In the present embodiment, reader 103 and RF tag 154 are passive RFIDs. That is, in the present embodiment, reader 103 transmits an electromagnetic wave to RF tag 154, and RF tag 154 transmits the electromagnetic wave transmitted by reader 103 as a reflected wave, with ID data, for example, being superimposed thereon at the time of the transmission. The reason for disposing reader 103 as described above is to enhance position detection precision by narrowing the transmission range of an electromagnetic wave since reader 103 is a transmission side first to transmit the electromagnetic wave.

As illustrated in FIG. 3B, reader 103 is disposed such that antenna 201 is positioned inside a projection space of hollow portion 102b projected in central axis P direction (vertical direction in FIG. 3B) of power supply coil 102a, and at a position farther away from power receiving coil 153a than facing surface 301 of power supply coil 102a to power receiving coil 153a. Further, as illustrated in FIG. 3A, reader 103 is disposed such that antenna 201 is positioned at the center of hollow portion 102b of power supply coil 102a, when seen from the direction in which power supply coil 102a and power receiving coil 153a face each other (S1 direction in FIG. 3B), which direction is parallel to the central axis P direction. It is noted that antenna 201 of reader 103 may be disposed at a position slightly deviated from the center of hollow portion 102b of power supply coil 102a.

Transmission and reception section 202 and control section 203 of reader 103 are preferably disposed at positions as far as possible from power supply coil 102a and power receiving coil 153a.

<Relative Position Between Reader and Power Supply Coil and Difference in Electromagnetic Field and Reception Level>

The relative position between reader 103 and power supply coil 102a in Embodiment 1 of the present invention and the difference in electromagnetic fields and reception levels will be described using FIGS. 4A and 4B.

Figure 4B:
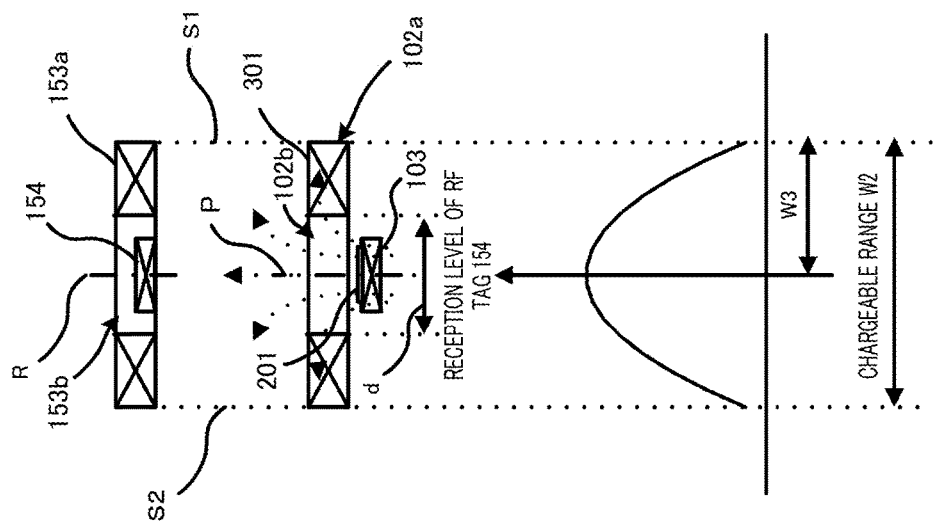
FIGS. 4A and 4B are diagrams illustrating the relative position between the reader and the power supply coil in Embodiment 1 of the present invention and the difference in electromagnetic fields and reception levels between FIGS. 4A and 4B.
Figure 4A:
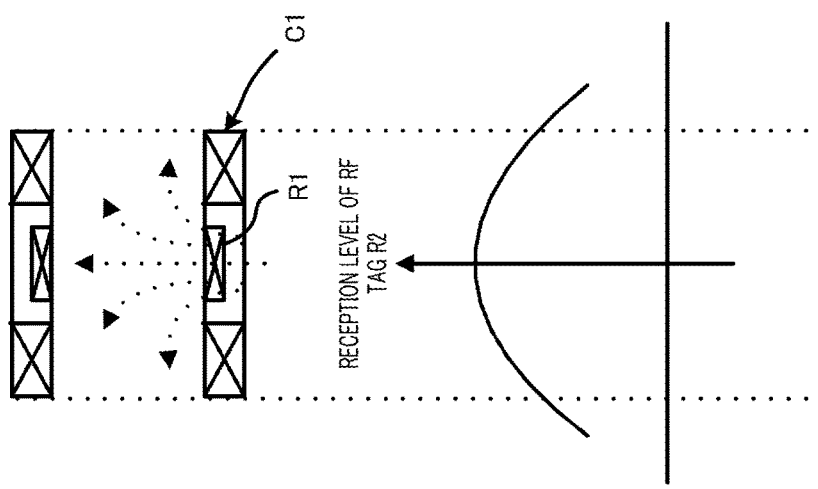

FIG. 4A illustrates the relative position between conventional reader R1 and power supply coil C1 and the electromagnetic field and the reception level in the related art. FIG. 4B illustrates the relative position between reader 103 and power supply coil 102a and the electromagnetic field and the reception level in the present embodiment.

As illustrated in FIGS. 4A and 4B, in the present embodiment, reader 103 is disposed at a position farther away from power receiving coil 153a than facing surface 301 of power supply coil 102a, which faces power receiving coil 153a. This allows power supply coil 102a to function as a shield for shielding spreading of an electromagnetic wave transmitted from reader 103. Accordingly, RF tag 154 can obtain a predetermined reception level in a narrower range than the related art. In addition, it is possible for an electromagnetic wave transmitted by reader 103 to have directionality.

It is thereby possible for power-supply-side control section 104 to determine that power supply coil 102a and power receiving coil 153a face each other when reader 103 receives a signal from RF tag 154, without setting a threshold.

The widening of the reception level of reader 103 in the direction of chargeable range W2 varies depending on the position of antenna 201 of reader 103. Accordingly, power supply apparatus 100 may be designed to start power supply when the reception level is equal to or greater than a threshold by setting an optimum threshold depending on the position of antenna 201 of reader 103.

Further, referring to FIG. 4B, power reception coil 153a can receive power supply in a range from a position at which central axis R of RF tag 154 and broken line S1 overlap each other to a position at which central axis R of RF tag 154 and broken line S2 overlap each other. Therefore, internal diameter d of power supply coil 102a is preferably equal to or greater than range W3 (W3=W2/2). In this case, hollow portion 102b in which the influence of a magnetic field decreases during power supply overlaps power receiving coil 153a, and thus it is possible to enhance the precision in determining whether or not power supply coil 102a and power receiving coil 153a face each other.

Figure 5:
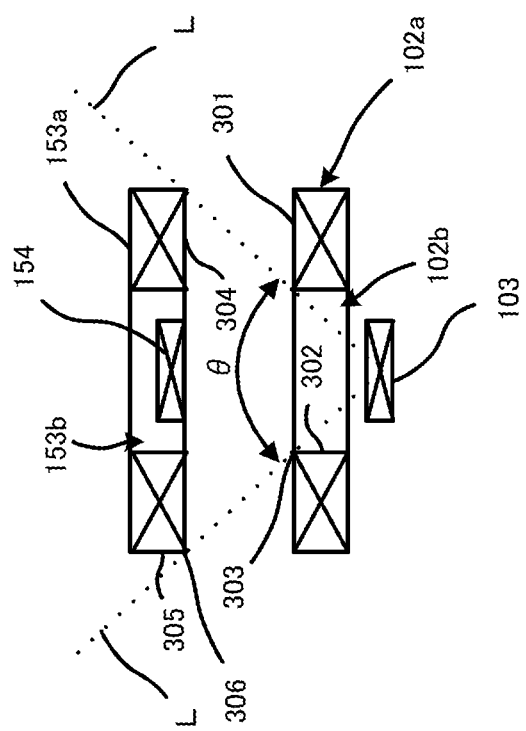
FIG. 5 is a diagram illustrating a preferred relative position between the power supply coil and the reader in Embodiment 1 of the present invention.

Power supply coil 102a and reader 103 are preferably disposed to have the relative position as illustrated in FIG. 5. That is, power supply coil 102a and reader 103 are disposed such that virtual line L extending radially toward power receiving coil 153a from the center portion of reader 103 and passing through connection portion 303 between internal wall 302 of power supply coil 102a and facing surface 301 passes through connection portion 306 between facing surface 304 of power receiving coil 153a, which faces power supply coil 102a, and external wall 305 of power receiving coil 153a. Thus, RF tag 154 cannot receive an electromagnetic wave transmitted from reader 103 until it enters the range of angle θ. Accordingly, power supply apparatus 100 is capable of supplying power, with power supply coil 102a and power receiving coil 153a being precisely positioned.

<Operation of Power Receiving Apparatus Before Power Supply>

Figure 6:
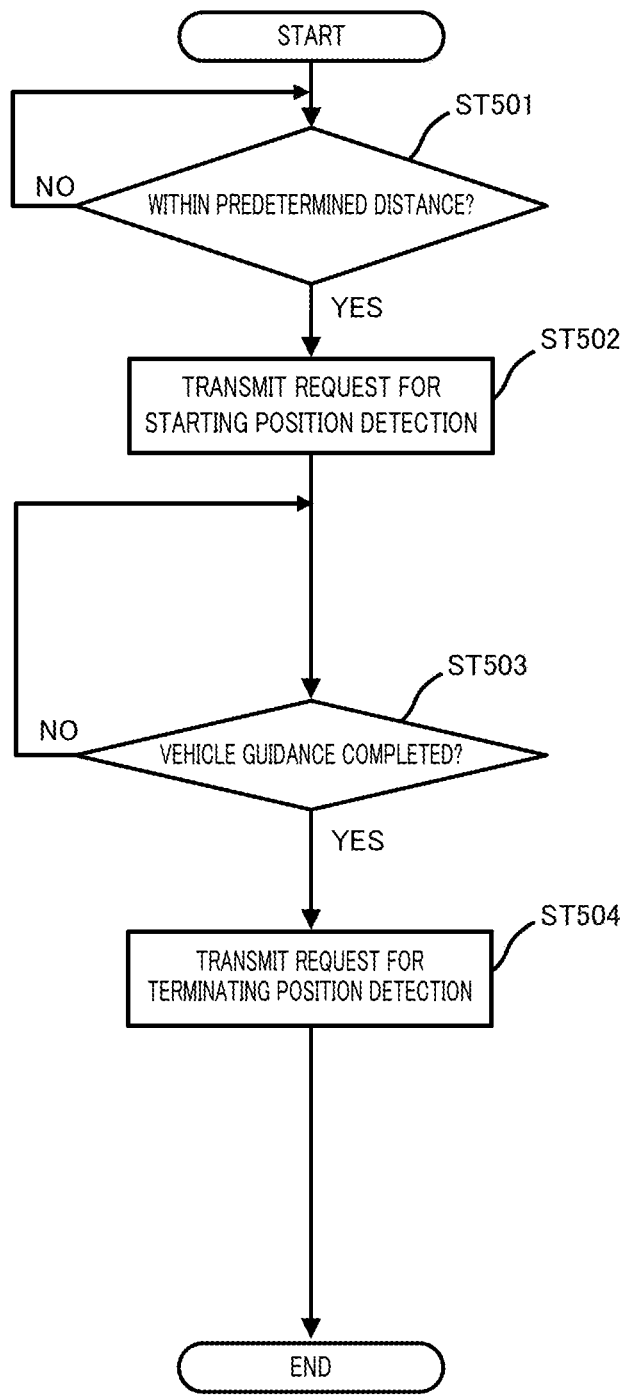
FIG. 6 is a flow chart showing the operations of a power receiving apparatus according to Embodiment 1 of the present invention before power supply.

The operations of power receiving apparatus 160 according to Embodiment 1 of the present invention before power supply will be described using FIG. 6. In FIG. 6, reader 103 and RF tag 154 are passive RFIDs.

First, vehicle-side control section 151 determines whether or not the distance between power receiving coil 153a and power supply coil 102a is within a predetermined distance before power supply (step ST501). For example, vehicle-side control section 151 determines whether or not the distance therebetween is within a predetermined distance based on the position of power supply apparatus 100 in the map information and on the current position information of vehicle 150 calculated from a signal from the GPS satellite, by utilizing a car navigation system, or the like.

When the distance is not within the predetermined distance (step ST501: No), vehicle-side control section 151 repeats the processing of step ST501.

On the other hand, when the distance is within the predetermined distance (step ST501: Yes), vehicle-side communication section 152 transmits a request for starting position detection (step ST502). Here, the position detection means obtaining the detection result indicating that RF tag 154 and antenna 201 of reader 103 face each other.

Next, vehicle-side control section 151 determines whether or not the guidance of vehicle 150 to power supply section 102 is completed (step ST503).

When the guidance of vehicle 150 to power supply section 102 is not completed (step ST503: No), vehicle-side control section 151 repeats the processing of step ST503.

On the other hand, when the guidance of vehicle 150 to power supply section 102 is completed (step ST503: Yes), vehicle-side communication section 152 transmits a request for terminating position detection (step ST504) to terminate the processing.

<Operation of Power Supply Apparatus Before Power Supply>

Figure 7:
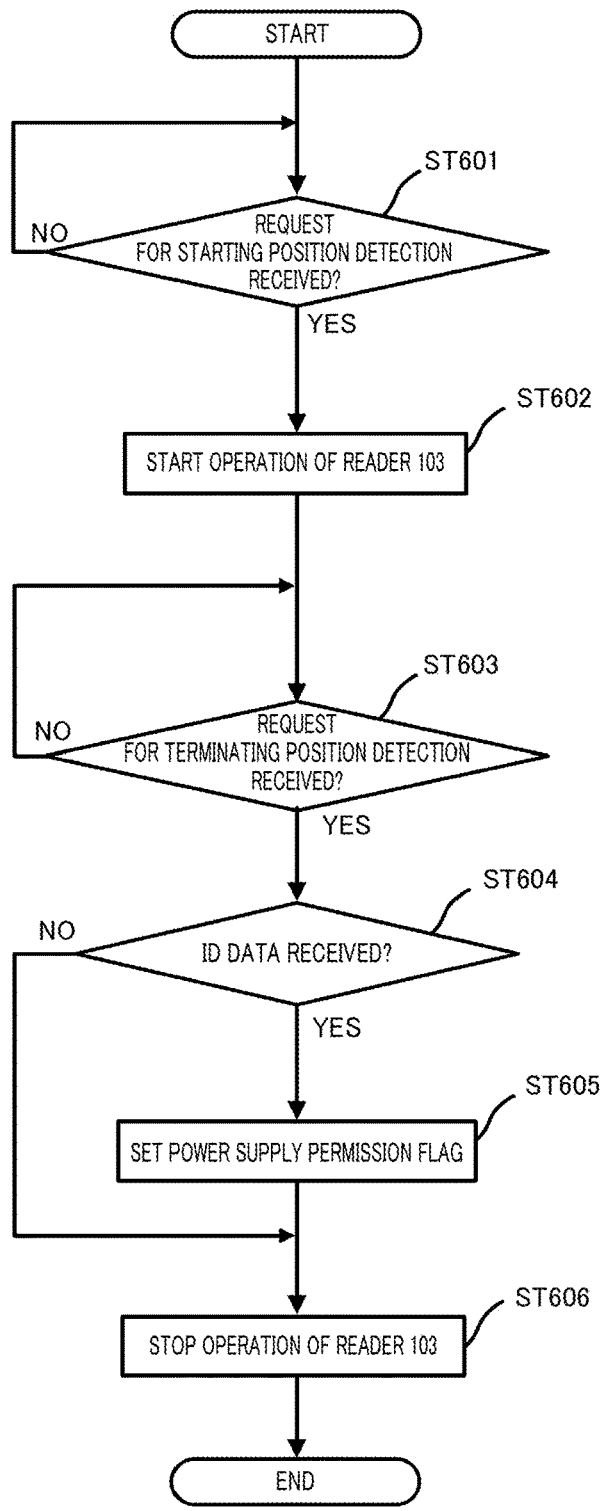
FIG. 7 is a flow chart showing the operations of a power supply apparatus according to Embodiment 1 of the present invention before power supply.

The operations of power supply apparatus 100 according to Embodiment 1 of the present invention before power supply will be described using FIG. 7. In FIG. 7, reader 103 and RF tag 154 are passive RFIDs.

First, power-supply-side communication section 101 determines whether or not the request for starting position detection transmitted from vehicle-side communication section 152 is received (step ST601).

When power-supply-side communication section 101 does not receive the request for starting position detection (step ST601: No), the processing of step ST601 is repeated.

On the other hand, when power-supply-side communication section 101 receives the request for starting position detection (step ST601: Yes), power-supply-side control section 104 starts the operation of reader 103 (step ST602). Thus, reader 103 transmits an electromagnetic wave.

Further, power-supply-side communication section 101 determines whether or not the request for terminating position detection transmitted from vehicle-side communication section 152 is received (step ST603).

When power-supply-side communication section 101 does not receive the request for terminating position detection (step ST603: No), the processing of step ST603 is repeated.

On the other hand, when power-supply-side communication section 101 receives the request for terminating position detection (step ST603: Yes), reader 103 determines whether or not ID data of RF tag 154 is received (step ST604).

When reader 103 receives the ID data of RF tag 154 (step ST604: Yes), power-supply-side control section 104 sets a power supply permission flag (step ST605). In this case, reader 103 receives the ID data from RF tag 154 present within chargeable range W2 (see FIG. 4B).

Then, power-supply-side control section 104 stops the operation of reader 103 (step ST606) to terminate the processing. Thus, reader 103 stops the transmission of an electromagnetic wave.

On the other hand, when reader 103 does not receive the ID data of RF tag 154 (step ST604: No), power-supply-side control section 104 skips the processing of step ST605 to perform the processing of step ST606.

<Operation of Power Supply Apparatus During Power Supply>

Figure 8:
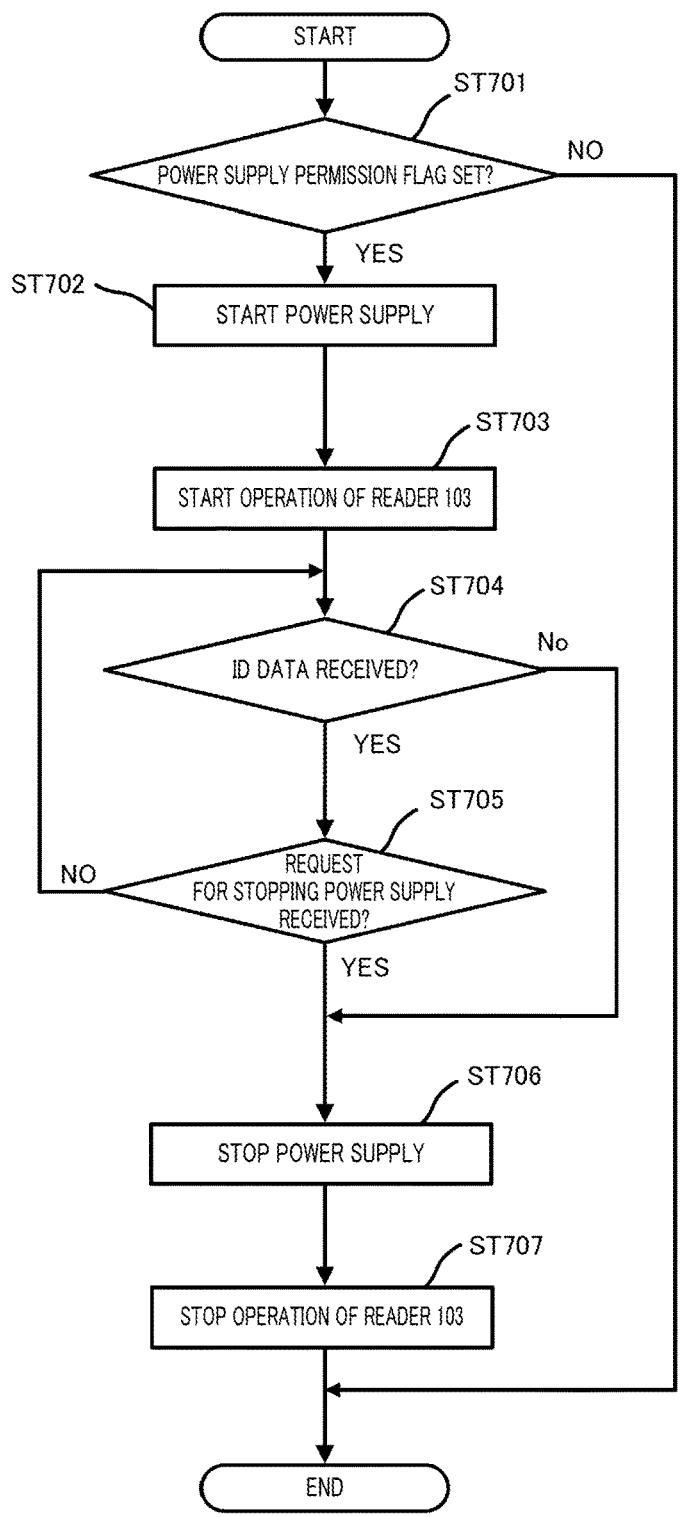
FIG. 8 is a flow chart showing the operations of the power supply apparatus according to Embodiment 1 of the present invention during power supply.

The operations of power supply apparatus 100 according to Embodiment 1 of the present invention during power supply will be described using FIG. 8. In FIG. 8, reader 103 and RF tag 154 are passive RFIDs.

First, power-supply-side control section 104 determines whether or not a power supply permission flag is set (step ST701).

When the power supply permission flag is not set in power-supply-side control section 104 (step ST701: No), power supply apparatus 100 terminates the processing. At that time, power supply apparatus 100 may notify vehicle 150 that power cannot be supplied. Vehicle 150 may be designed to inform a driver that parking should be redone when vehicle 150 is notified that power cannot be supplied.

On the other hand, when the power supply permission flag is set (step ST701: Yes), power-supply-side control section 104 allows power supply section 102 to start power supply (step ST702).

Next, power-supply-side control section 104 starts the operation of reader 103 (step ST703). Thus, reader 103 transmits an electromagnetic wave.

Next, reader 103 determines whether or not the ID data of RF tag 154 is received (step ST704).

When reader 103 receives the ID data of RF tag 154 (step ST704: Yes), power-supply-side communication section 101 determines whether or not a request for stopping power supply is received (step ST705).

When power-supply-side communication section 101 does not receive the request for stopping power supply (step ST705: No), the operation returns to the processing of step ST704.

On the other hand, when power-supply-side communication section 101 receives the request for stopping power supply (step ST705: Yes), power-supply-side control section 104 controls power supply section 102 to stop power supply (step ST706).

Further, when reader 103 does not receive the ID data of RF tag 154 (step ST704: No), power-supply-side control section 104 controls power supply section 102 to stop power supply (step ST706). This situation occurs when RF tag 154 is not present within chargeable range W2 (see FIG. 4B) any more, for example, as a result of vehicle 150 having been moved during power supply.

Then, power-supply-side control section 104 stops the operation of reader 103 (step ST707) to terminate the processing.

<Vehicle Parking Pattern>

The vehicle parking pattern in Embodiment 1 of the present invention will be described using FIGS. 9A and 9B.

Figure 9B:
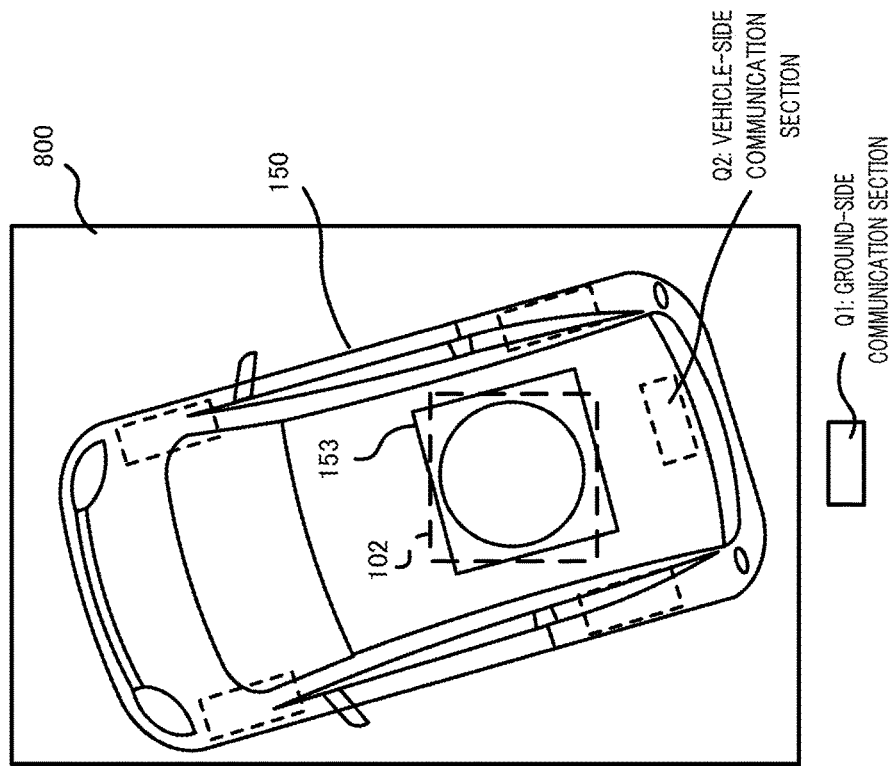
FIGS. 9A and 9B are diagrams illustrating the states of a parked vehicle in Embodiment 1 of the present invention.
Figure 9A:
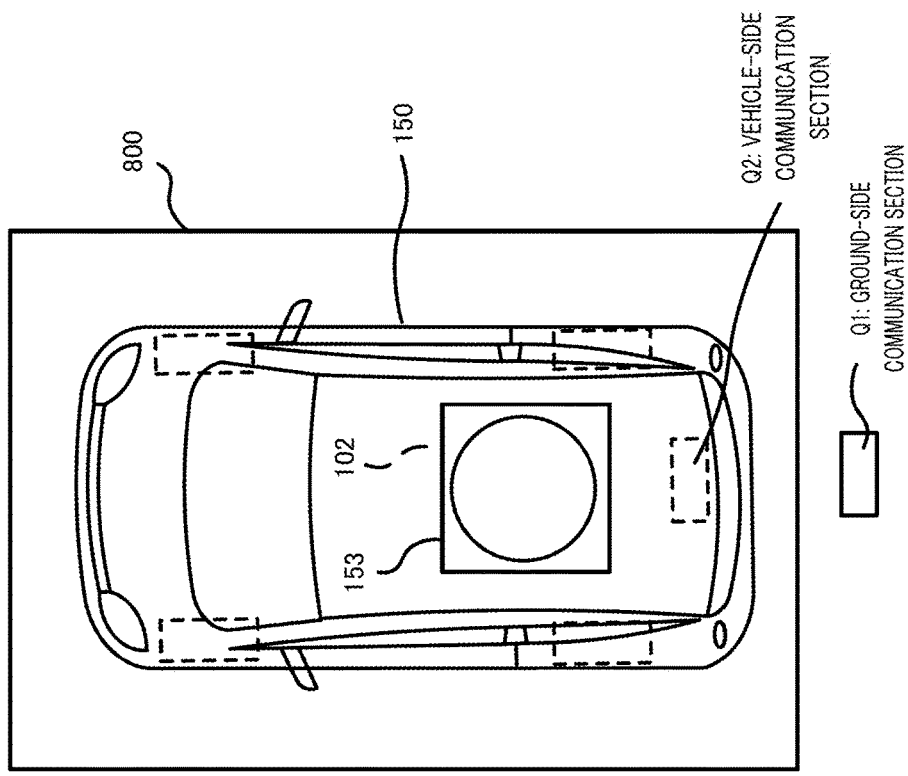

FIG. 9A illustrates a case in which vehicle 150 is parked along parking space 800, and FIG. 9B illustrates a case in which vehicle 150 is parked obliquely in parking space 800.

In the case of normal parking state as illustrated in FIG. 9A, power supply is possible in any of the related art and the present embodiment. During that time, power supply coil 102a and power receiving coil 153a face each other.

On the other hand, when vehicle 150 is parked obliquely in parking space 800, as illustrated in FIG. 9B, vehicle-side communication section Q2 and ground-side communication section Q1 fail to face each other in the related art, thus making it impossible to establish communication, so that vehicle 150 is not considered to be parked at the most appropriate position for power supply. Accordingly, in the related art, power cannot be supplied despite the fact that power supply coil 102a and power receiving coil 153a face each other. In the present embodiment, the disposition of antenna 201 of reader 103 at the center of hollow portion 102b of power supply coil 102a and the disposition of the RF tag at the center of hollow portion 153b of power receiving coil 153a make it possible to establish communication between reader 103 and RF tag 154, thus enabling power supply, even when vehicle 150 is parked obliquely in parking space 800, as long as power supply coil 102a and power receiving coil 153a face each other.

<Effects of Embodiment 1>

According to the present embodiment, it is possible to detect that the power supply section and the power receiving section face each other, irrespective of the state of a stopped vehicle, by disposing reader 103 such that antenna 201 is positioned inside a projection space of hollow portion 102b projected in central axis P direction of power supply coil 102a, and at a position farther away from power receiving coil 153a than facing surface 301 of power supply coil 102a, which faces power receiving coil 153a.

In the present embodiment, reader 103 is disposed such that antenna 201 is positioned inside a projection space of hollow portion 102b projected in central axis P direction of power supply coil 102a, and at a position farther away from power receiving coil 153a than facing surface 301 of power supply coil 102a, which faces power receiving coil 153a. Thus, according to the present embodiment, it becomes possible to narrow the transmission range of an electromagnetic wave from reader 103, which therefore enables power receiving coil 153a and power supply coil 102a to be precisely positioned.

According to the present embodiment, the disposition of reader 103 at central axis P of power supply coil 102a and the disposition of RF tag 154 at the central axis of R of power receiving coil 153a allow a communicable range with RF tag 154 to be adjustable evenly, only by the adjustment of the distance of reader 103 from power receiving coil 153a in central axis P direction. For example, by making the distance between power receiving coil 153a and reader 103 in central axis P direction larger, it becomes possible to narrow the communicable range; and by making the above-mentioned distance smaller, it becomes possible to widen the communicable range. Since power supply coil 102a has a spiral shape, it is possible to adjust the communicable range evenly in any direction.

Figure 10B:
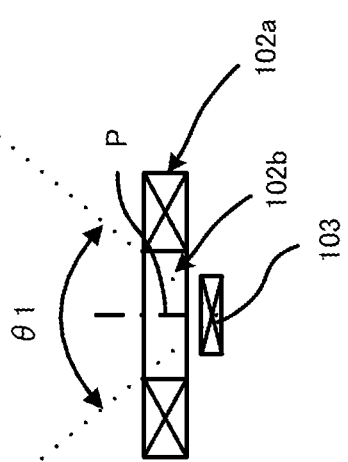
FIGS. 10A and 10B are diagrams illustrating the variation of a communicable range depending on the position of the reader in Embodiment 1 of the present invention.
Figure 10A:
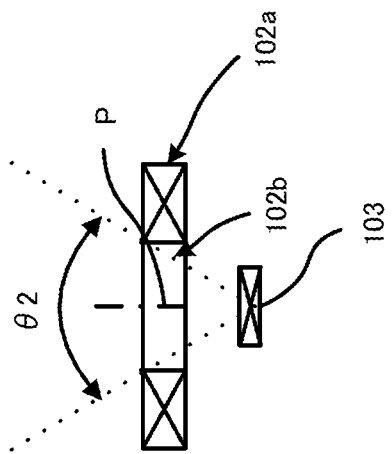

Referring to FIGS. 10A and 10B, when the distance of reader 103 from power receiving coil 153a in central axis P direction in FIG. 10B is larger than the distance in FIG. 10A, angle θ2 of the communicable range in FIG. 10B is smaller than angle θ1 of the communicable range in FIG. 10A (θ1>θ2). That is, the communicable range in FIG. 10B can be narrower than that in FIG. 10A.

According to the present embodiment, reader 103 is provided on the power-supply-side and RF tag 154 excellent in durability is provided in vehicle 150, and thus it is possible to provide a power supply system excellent in durability with less breakdown, or the like.

According to the present embodiment, reader 103 is disposed at a position farther away from power supply coil 102a, and thus it is possible to make a magnetic field generated from power supply coil 102a less influential in reader 103.

According to the present embodiment, when internal diameter d of power supply coil 102a is set equal to or greater than range W3, a half of the chargeable range, the hollow portion in which the influence of a magnetic field decreases overlaps power receiving coil 153a during power supply, so that it is possible to enhance the precision in determining whether or not power supply coil 102a and power receiving coil 153a face each other.

<Variation of Embodiment 1>

While RF tag 154 is configured such that the bottom surface of RF tag 154 is positioned at a facing surface of power receiving coil 153a where power receiving coil 153a faces power supply coil 102a in the present embodiment, RF tag 154 may be disposed at a position farther away from power supply coil 102a than the facing surface of power receiving coil 153a which faces power supply coil 102a, in the same manner as reader 103.

Embodiment 2

The configurations of a power supply system, a power supply apparatus and a power receiving apparatus according to Embodiment 2 of the present invention are the same as those in FIGS. 1 to 3A and 3B, except the relative position between power supply coil 102a and reader 103 and the relative position between power receiving coil 153a and RF tag 154, and thus descriptions thereof will be omitted. It is noted that, in the present embodiment, the same reference signs as those in the above-described Embodiment 1 are used to describe the respective components.

<Relative Position Between RF Tag and Power Receiving Coil>

The relative position between RF tag 154 and power receiving coil 153a in Embodiment 2 of the present invention will be described using FIG. 11.

In the present embodiment, reader 103 and RF tag 154 are active RFIDs. That is, in the present embodiment, RF tag 154 has a built-in battery, and transmits an electromagnetic wave with, for example, ID data superimposed thereon to reader 103 on its own power. In the present embodiment, the reason for disposing RF tag 154 as described above is to enhance position detection precision by narrowing the transmission range of an electromagnetic wave since RF tag 154 is a transmission side to transmit the electromagnetic wave.

Figure 11:
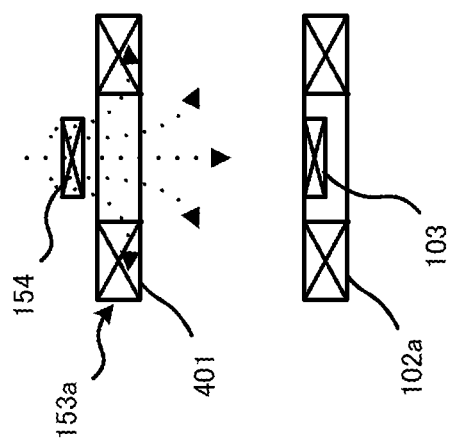
FIG. 11 is a diagram illustrating the relative position between a power receiving coil and an RF tag in Embodiment 2 of the present invention.

As illustrated in FIG. 11, in the present embodiment, RF tag 154 is disposed at a position farther away from power supply coil 102a than facing surface 401 of power receiving coil 153a, which faces power supply coil 102a. This allows power receiving coil 153a to function as a shield for shielding spreading of an electromagnetic wave transmitted from RF tag 154. Accordingly, reader 103 can obtain a predetermined reception level in a narrower range than the related art. In addition, it is possible for an electromagnetic wave transmitted by RF tag 154 to have directionality.

<Operation of Power Receiving Apparatus Before Power Supply>

Figure 12:
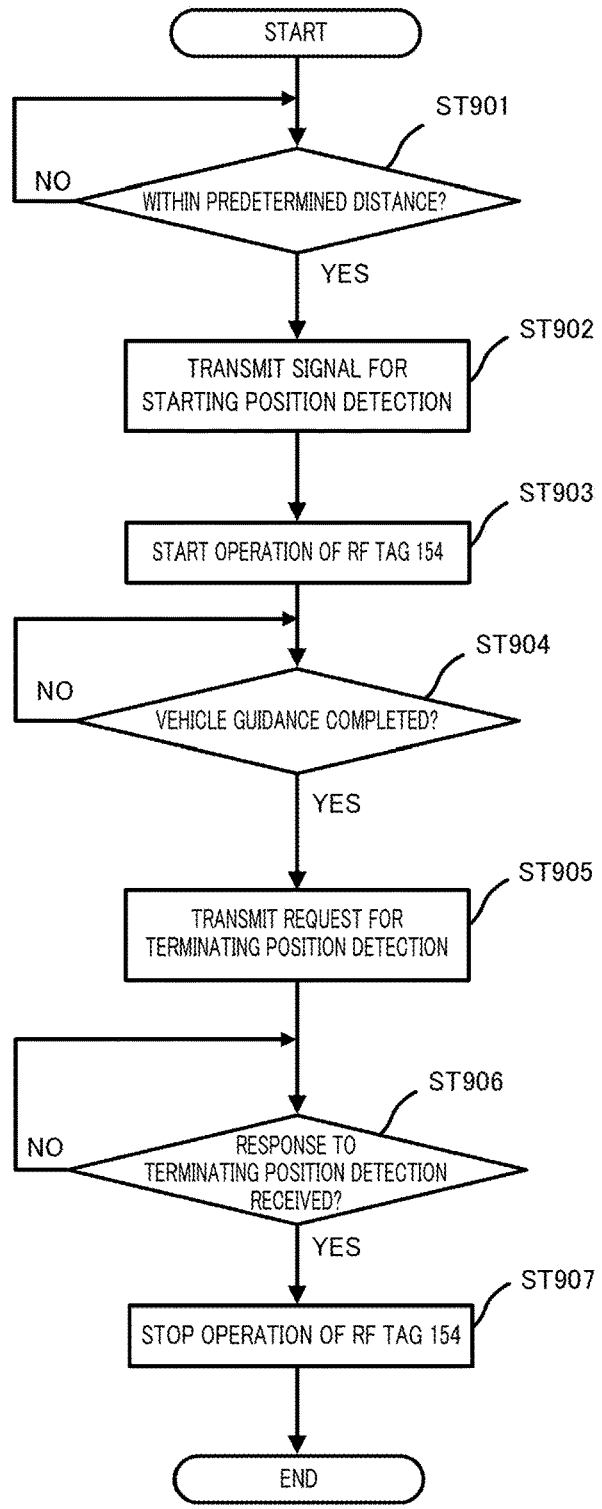
FIG. 12 is a flow chart showing the operations of a power receiving apparatus according to Embodiment 2 of the present invention before power supply.

The operations of power receiving apparatus 160 according to Embodiment 2 of the present invention before power supply will be described using FIG. 12. In FIG. 12, reader 103 and RF tag 154 are active RFIDs.

First, vehicle-side control section 151 determines whether or not the distance between power receiving coil 153a and power supply coil 102a is within a predetermined distance before power supply (step ST901). For example, vehicle-side control section 151 determines whether or not the distance therebetween is within a predetermined distance based on the position of power supply apparatus 100 in the map information and on the current position information of vehicle 150 calculated from a signal from the GPS satellite, by utilizing a car navigation system, or the like.

When the distance is not within the predetermined distance (step ST901: No), vehicle-side control section 151 repeats the processing of step ST901.

On the other hand, when the distance is within the predetermined distance (step ST901: Yes), vehicle-side communication section 152 transmits a signal for starting position detection (step ST902).

Next, vehicle-side control section 151 starts the operation of RF tag 154 (step ST903). Thus, RF tag 154 transmits an electromagnetic wave.

Next, vehicle-side control section 151 determines whether or not the guidance of vehicle 150 to power supply section 102 is completed (step ST904).

When the guidance of vehicle 150 to power supply section 102 is not completed (step ST904: No), vehicle-side control section 151 repeats the processing of step ST904.

On the other hand, when the guidance of vehicle 150 to power supply section 102 is completed (step ST904: Yes), vehicle-side communication section 152 transmits a request for terminating position detection (step ST905).

Next, vehicle-side communication section 152 determines whether or not a response to terminating position detection transmitted from power-supply-side communication section 101 is received (step ST906).

When the response to terminating position detection is not received (step ST906: No), vehicle-side communication section 152 repeats the processing of step ST906.

On the other hand, when the response to terminating position detection is received by vehicle-side communication section 152 (step ST906: Yes), vehicle-side control section 151 stops the operation of RF tag 154 (step ST907) to terminate the processing. Thus, RF tag 154 stops the transmission of an electromagnetic wave.

<Operation of Power Supply Apparatus Before Power Supply>

Figure 13:
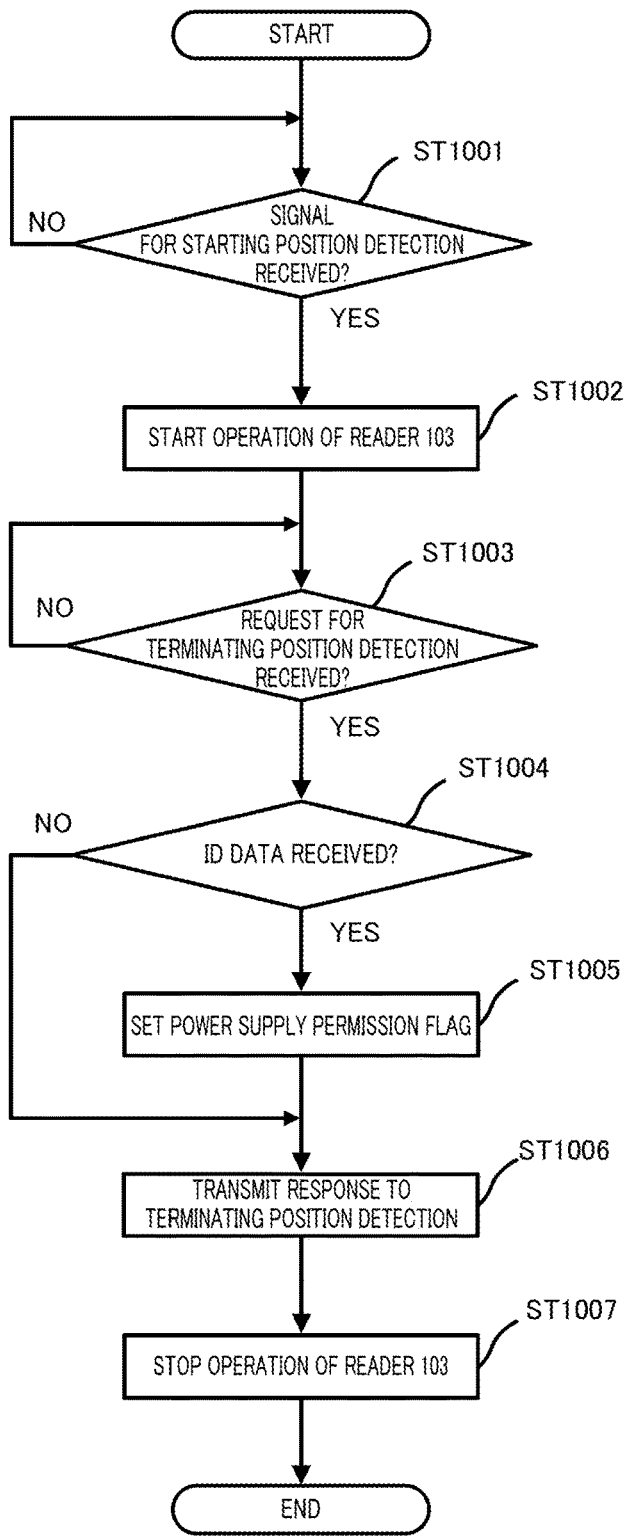
FIG. 13 is a flow chart showing the operations of a power supply apparatus according to Embodiment 2 of the present invention before power supply.

The operations of power supply apparatus 100 according to Embodiment 2 of the present invention before power supply will be described using FIG. 13. In FIG. 13, reader 103 and RF tag 154 are active RFIDs.

First, power-supply-side communication section 101 determines whether or not the signal for starting position detection transmitted from vehicle-side communication section 152 is received (step ST1001).

When the request for starting position detection is not received (step ST1001: No), power-supply-side communication section 101 repeats the processing of step ST1001.

On the other hand, when the request for starting position detection is received by power-supply-side communication section 101 (step ST1001: Yes), power-supply-side control section 104 starts the operation of reader 103 (step ST1002). This enables reader 103 to receive an electromagnetic wave transmitted from RF tag 154 when RF tag 154 is present within chargeable range W2 (see FIG. 4B).

Further, power-supply-side communication section 101 determines whether or not the request for terminating position detection transmitted from vehicle-side communication section 152 is received (step ST1003).

When the request for terminating position detection is not received (step ST1003: No), power-supply-side communication section 101 repeats the processing of step ST1003.

On the other hand, when the request for terminating position detection is received by power-supply-side communication section 101 (step ST1003: Yes), reader 103 determines whether or not the ID data of RF tag 154 is received (step ST1004).

When the ID data of RF tag 154 is received by reader 103 (step ST1004: Yes), power-supply-side control section 104 sets a power supply permission flag (step ST1005). In this case, reader 103 receives the ID data from RF tag 154 present within chargeable range W2 (see FIG. 4B).

Next, power-supply-side communication section 101 transmits a response to terminating position detection (step ST1006).

Then, power-supply-side control section 104 stops the operation of reader 103 (step ST1007) to terminate the processing.

On the other hand, when the ID data of RF tag 154 is not received by reader 103 (step ST1004: No), power-supply-side control section 104 skips the processing of step ST1005 to perform the processing of step ST1006.

<Operation of Power Receiving Apparatus During Power Supply>

Figure 14:
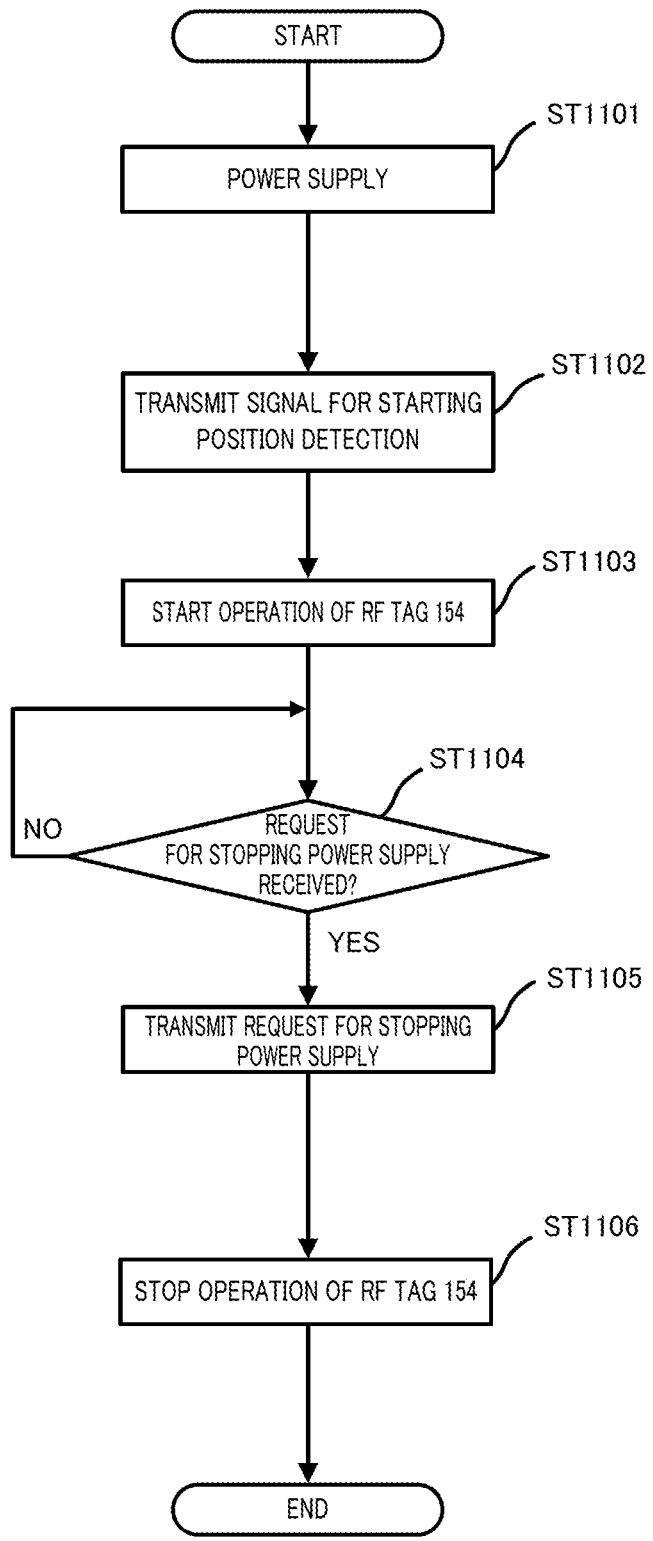
FIG. 14 is a flow chart showing the operations of the power receiving apparatus according to Embodiment 2 of the present invention during power supply.

The operations of power receiving apparatus 160 according to Embodiment 2 of the present invention during power supply will be described using FIG. 14.

First, power receiving section 153 receives power as a result of power supply section 102 starting power supply (step ST1101).

Next, vehicle-side communication section 152 transmits a signal for starting position detection (step ST1102).

Next, vehicle-side control section 151 starts the operation of RF tag 154 (step ST1103). Thus, RF tag 154 transmits an electromagnetic wave.

Next, vehicle-side control section 151 determines whether or not there is a request for stopping power supply (step ST1104).

When there is no request for stopping power supply (step ST1104: No), vehicle-side control section 151 repeats the processing of step ST1104.

On the other hand, when there is a request for stopping power supply (step ST1104: Yes), vehicle-side communication section 152 transmits the request for stopping power supply (step ST1105).

Next, vehicle-side control section 151 stops the operation of RF tag 154 (step ST1106) to terminate the processing. Thus, RF tag 154 stops the transmission of an electromagnetic wave.

<Operation of Power Supply Apparatus During Power Supply>

Figure 15:
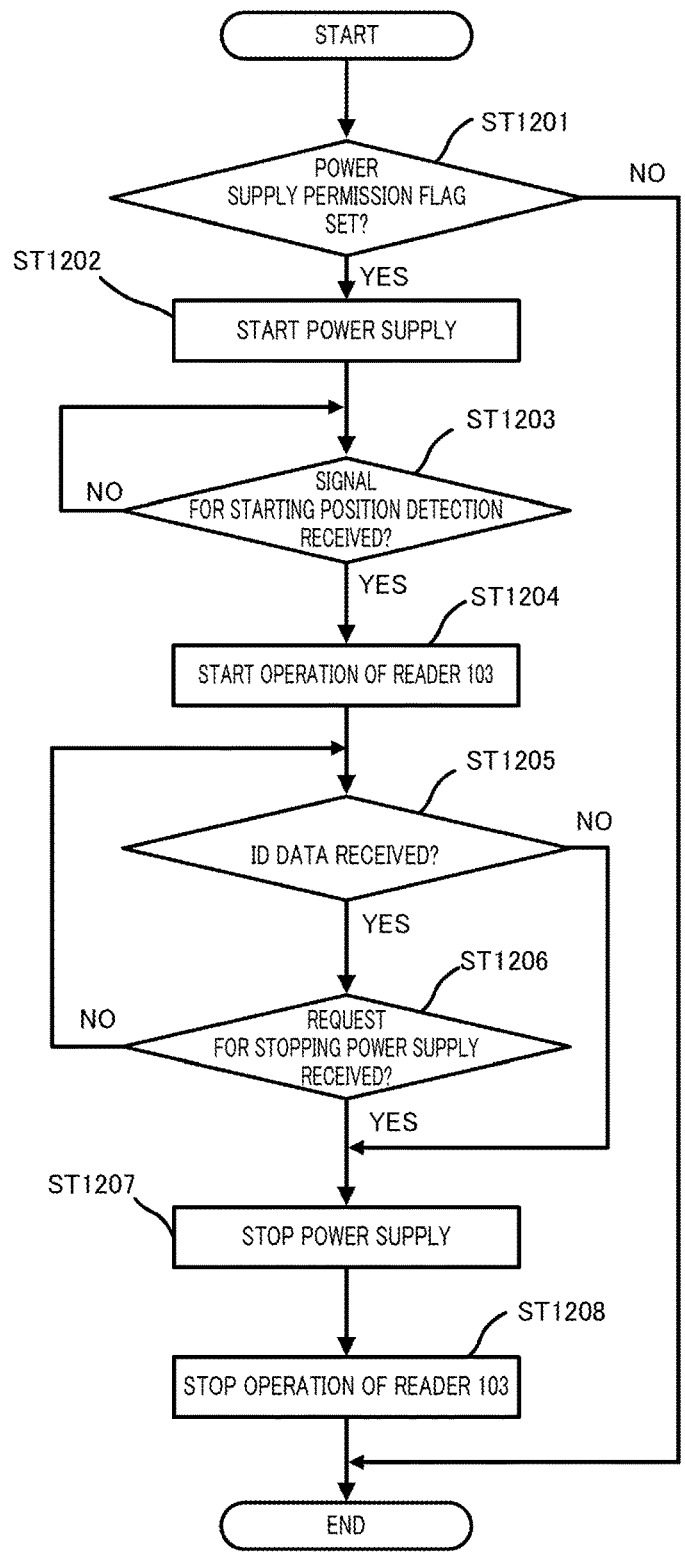
FIG. 15 is a flow chart showing the operations of the power supply apparatus according to Embodiment 2 of the present invention during power supply.

The operations of power supply apparatus 100 according to Embodiment 2 of the present invention during power supply will be described using FIG. 15. In FIG. 15, reader 103 and RF tag 154 are active RFIDs.

First, power-supply-side control section 104 determines whether or not a power supply permission flag is set (step ST1201).

When the power supply permission flag is not set in power-supply-side control section 104 (step ST1201: No), power supply apparatus 100 terminates the processing.

On the other hand, when the power supply permission flag is set (step ST1201: Yes), power-supply-side control section 104 allows power supply section 102 to start power supply (step ST1202).

Next, power-supply-side communication section 101 determines whether or not the signal for starting position detection transmitted from vehicle-side communication section 152 is received (step ST1203).

When the signal for starting position detection is not received (step ST1203: No), power-supply-side communication section 101 repeats the processing of step ST1203.

On the other hand, when the signal for starting position detection is received by power-supply-side communication section 101 (step ST1203: Yes), power-supply-side control section 104 starts the operation of reader 103 (step ST1204). This enables reader 103 to receive an electromagnetic wave transmitted from RF tag 154 when RF tag 154 is present within chargeable range W2 (see FIG. 4B).

Next, reader 103 determines whether or not the ID data of RF tag 154 is received (step ST1205).

When the ID data of RF tag 154 is received by reader 103 (step ST1205: Yes), power-supply-side communication section 101 determines whether or not a request for stopping power supply is received (step ST1206).

When power-supply-side communication section 101 does not receive the request for stopping power supply (step ST1206: No), the operation returns to the processing of step ST1205.

On the other hand, when power-supply-side communication section 101 receives the request for stopping power supply (step ST1206: Yes), power-supply-side control section 104 controls power supply section 102 to stop power supply (step ST1207).

Further, when the ID data of RF tag 154 is not received by reader 103 (step ST1205: No), power-supply-side control section 104 controls power supply section 102 to stop power supply (step ST1207).

Then, power-supply-side control section 104 stops the operation of reader 103 (step ST1208) to terminate the processing.

<Effects of Embodiment 2>

According to the present embodiment, it is possible to detect that the power supply section and the power receiving section face each other, irrespective of the state of a stopped vehicle.

In the present embodiment, RF tag 154 is disposed at a position farther away from power supply coil 102a than facing surface 401 of power receiving coil 153a, and at the center of hollow portion 153b of power receiving coil 153a. Thus, according to the present embodiment, it becomes possible to narrow the transmission range of an electromagnetic wave from RF tag 154, which therefore enables power receiving coil 153a and power supply coil 102a to be precisely positioned.

According to the present embodiment, reader 103 is provided on the power-supply-side and RF tag 154 excellent in durability is provided in vehicle 150, and thus it is possible to provide a power supply system excellent in durability with less breakdown, or the like.

According to the present embodiment, RF tag 154 is disposed at a position farther away from power receiving coil 153a, and thus it is possible to make a magnetic field generated from power receiving coil 153a less influential in RF tag 154.

<Variation of Embodiment 2>

While reader 103 is designed such that the upper surface of reader 103 is positioned at a facing surface of power supply coil 102a where power supply coil 102a faces power receiving coil 153a in the present embodiment, reader 103 may be disposed at a position farther away from power receiving coil 153a than the facing surface of power supply coil 102a which faces power receiving coil 153a, in the same manner as RF tag 154.

Embodiment 3

The configurations of a power supply system according to Embodiment 3 of the present invention are the same as those in FIG. 1, and thus the descriptions thereof will be omitted.

<Configuration of Power Supply Section>

Figure 16:
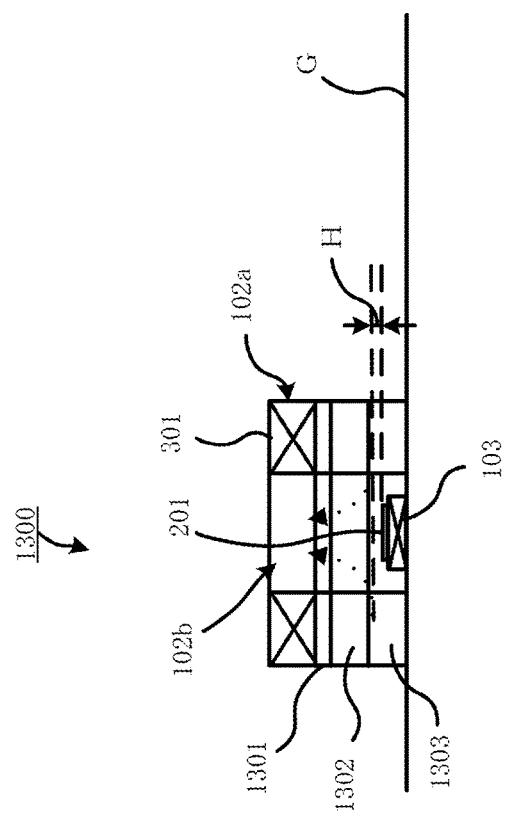
FIG. 16 is a diagram illustrating the configuration of a part of a power supply section in Embodiment 3 of the present invention.

The configuration of power supply section 1300 in Embodiment 3 of the present invention will be described using FIG. 16. It is noted that, in FIG. 16, the same reference signs are given to components having the same configurations as those in FIGS. 1, 3A and 3B, and the descriptions thereof will be omitted.

Power supply section 1300 is mainly composed of power supply coil 102a, insulator 1301, magnetic body 1302, and mount 1303. It is noted that, in FIG. 16, the description of a housing that houses power supply coil 102a is omitted.

Power supply section 1300 is a laminate in which mount 1303, magnetic body 1302, insulator 1301, and power supply coil 102a are laminated in this order.

Insulator 1301 is provided between power supply coil 102a and magnetic body 1302 to insulate power supply coil 102a and magnetic body 1302 from each other.

Magnetic body 1302 is provided between mount 1303 and insulator 1301 on the opposite surface side of facing surface 301 of power supply coil 102a. Magnetic body 1302 is provided for allowing a magnetic field generated from power supply coil 102a during power supply to be stronger. Magnetic body 1302 is ferrite, for example.

Mount 1303 is formed of an insulation material, and is provided between ground G and magnetic body 1302.

Antenna 201 of reader 103 is disposed at a position farther away from power receiving coil 153a than magnetic body 1302. This allows reader 103 to be less susceptible to the magnetic field generated by providing magnetic body 1302. Further, antenna 201 of reader 103 is preferably disposed to be closer to ground G than the magnetic field during power supply generated by providing magnetic body 1302, the magnetic field being indicated by broken arrows. In this case, the height of mount 1303 from ground G is set such that gap H is formed between the bottom surface of magnetic body 1302 and the upper surface of reader 103. It is noted that the configurations of reader 103 other than those described above are the same as those in the above-described Embodiment 1, and thus the descriptions thereof will be omitted.

It is noted that the operations of power supply apparatus 100 and power receiving apparatus 160 in the present embodiment are the same as those in FIGS. 6 to 8, and thus the descriptions thereof will be omitted.

<Effect of Embodiment 3>

According to the present embodiment, in addition to obtaining the above-described effects of Embodiment 1, providing antenna 201 of reader 103 to be closer to ground G than magnetic body 1302 can prevent antenna 201 from generating an electromotive voltage under the influence of a magnetic field occurring between power supply coil 102a and power receiving coil 153a.

Further, according to the present embodiment, it is possible to reduce the influence of a magnetic field on antenna 201, and thus it is not necessary to provide reader 103 with a protection circuit against an electromotive voltage, thereby enabling inexpensive reader 103 to be used, which leads to reduction in manufacturing cost.

<Variation of Embodiment 3>

While power supply section 1300 is provided with magnetic body 1302 in the present embodiment, the power receiving section may be provided with a magnetic body, and RF tag 154 may be disposed at a position farther away from the power supply coil than the magnetic body. In this case, the magnetic body is disposed near a side of a surface of power receiving coil 153a opposite to facing surface 401. The operations of the power supply apparatus and the power receiving apparatus in this case are the same as those in FIGS. 12 to 15, and thus the descriptions thereof will be omitted.

Embodiment 4

The configurations of a power supply system according to Embodiment 4 of the present invention are the same as those in FIG. 1, and thus the descriptions thereof will be omitted.

<Configuration of Power Supply Section>

Figures 17A, 17B:
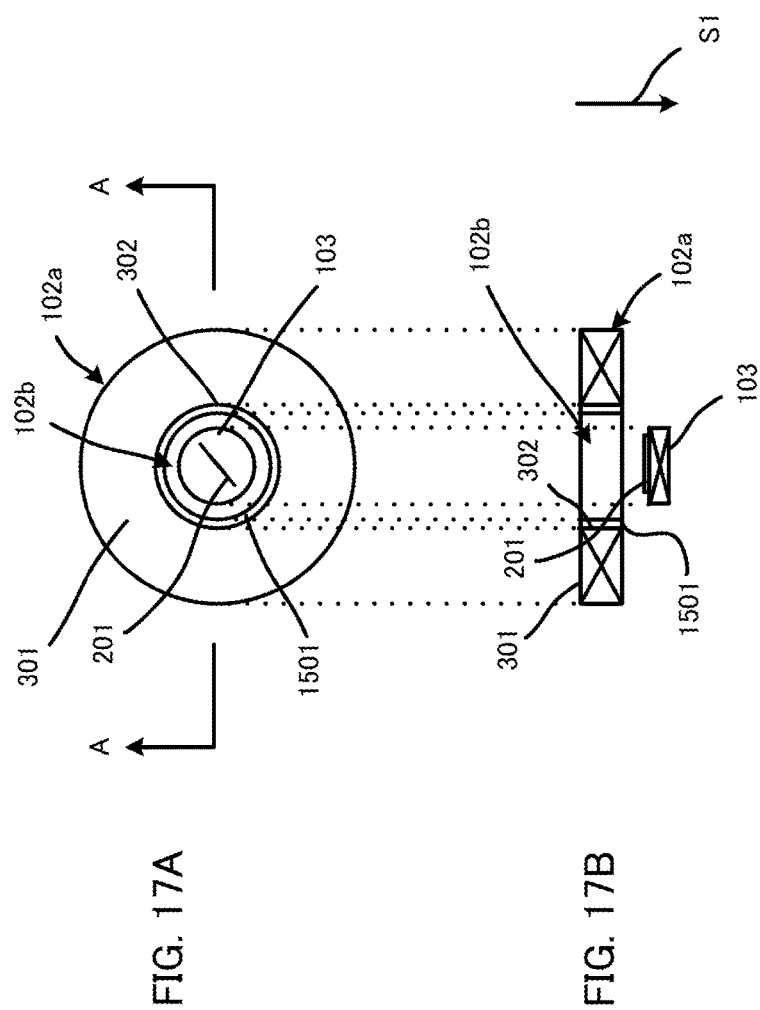
FIGS. 17A and 17B are diagrams illustrating the configuration of a part of a power supply section in Embodiment 4 of the present invention.

The configuration of a power supply section in Embodiment 4 of the present invention will be described using FIGS. 17A and 17B. It is noted that, in FIGS. 17A and 17B, the same reference signs are given to components having the same configurations as those in FIGS. 3A and 3B, so that the descriptions thereof will be omitted.

The power supply section in the present embodiment has electromagnetic wave absorber 1501 that covers inner wall 302 of power supply coil 102a, which defines hollow portion 102b. Electromagnetic wave absorber 1501 absorbs an electromagnetic wave in a frequency band other than the frequency band used to transmit and/or receive between RF tag 154 and reader 103.

It is noted that the operations of power supply apparatus 100 and power receiving apparatus 160 in the present embodiment are the same as those in FIGS. 6 to 8, and thus the descriptions thereof will be omitted.

<Effects of Embodiment 4>

In the present embodiment, electromagnetic wave absorber 1501 that covers the inner wall of power supply coil 102a is provided to absorb an electromagnetic wave in a frequency band other than the frequency band used to transmit and/or receive between RF tag 154 and reader 103. Thus, according to the present embodiment, no electromagnetic field leaks toward the surrounding area, and thus it is possible to suppress harmful effects such as undesirably heating a metal object such as housing, in addition to obtaining the above-described effects of Embodiment 1.

<Variation of Embodiment 4>

While electromagnetic wave absorber 1501 that covers the inner wall of power supply coil 102a is provided in the present embodiment, an electromagnetic wave absorber that covers the inner wall of power receiving coil 153a may be provided. The operations of the power supply apparatus and the power receiving apparatus in this case are the same as those in FIGS. 12 to 15, and thus the descriptions thereof will be omitted.

<Variation Common to all Embodiments>

While reader 103 is provided on the ground side and RF tag 154 is provided in vehicle 150 in the above-described Embodiments 1 to 4, RF tag 154 may be provided on the ground side and reader 103 may be provided in vehicle 150. In this case, whether or not power receiving coil 153a and power supply coil 102a face each other is determined in vehicle 150.

While reader 103 and RF tag 154 are used for position detection in the above-described Embodiments 1 to 4, an apparatus or a system for position detection other than reader 103 and RF tag 154 can be used. That is, in the above-described Embodiments 1 to 4, any system that can establish a mutual communication by radio communication using an electromagnetic wave is sufficient, and it is also possible to use a coil for near field communication (NFC) or position detection, other than the RF tag. The coils for NFC and position detection both correspond to a radio tag. At that time, an antenna of NFC or a coil for position detection is disposed at a position farther away from power supply coil 102a or power receiving coil 153a than a facing surface facing power supply coil 102a and power receiving coil 153a, and at the center of hollow portion 102b of power supply coil 102a or hollow portion 153b of power receiving coil 153a when seen from the direction in which power supply coil 102a and power receiving coil 153a face each other.

While description has been made assuming that a single RF tag 154 is provided in the above-described Embodiments 1 to 4, more than one RF tags 154 can be provided. For example, a plurality of RF tags 154 may be provided in hollow portion 153b of power receiving coil 153a.

The disclosure of Japanese Patent Application No. 2013-071863, filed on Mar. 29, 2013, including the specification, drawings and abstract, is incorporated herein by reference in its entirety.

INDUSTRIAL APPLICABILITY

The power supply apparatus and the power receiving apparatus according to the present invention are suitable for use in transmitting and/or receiving power in a wireless manner.

REFERENCE SIGNS LIST

10 Power supply system
100 Power supply apparatus
101 Power-supply-side communication section
102 Power supply section
102a Power supply coil
102b, 153b Hollow portion
103 Reader
104 Power-supply-side control section
150 Vehicle
151 Vehicle-side control section
152 Vehicle-side communication section
153 Power receiving section
153a Power receiving coil
154 RF tag
155 Storage battery
160 Power receiving apparatus

The invention claimed is:

1. A power supply apparatus comprising:
a power supply coil having a ring shape and configured to transmit power to a power receiving coil located externally; and
at least one antenna configured to receive a signal, wherein:
the power supply apparatus transmits the power to the power receiving coil based on the signal received by the at least one antenna,
the at least one antenna overlaps a hollow portion of the ring shape of the power supply coil in a central axis direction of the power supply coil which is controlled to transmit the power based on the signal received by the at least one antenna, and
at least a part of the at least one antenna is located out of the hollow portion of the ring shape of the power supply coil which is controlled to transmit the power based on the signal received by the at least one antenna.

2. The power supply apparatus according to claim 1, wherein
the power supply coil is configured to face the power receiving coil.

3. The power supply apparatus according to claim 1, wherein
the at least one antenna is capable of receiving the signal as an electromagnetic wave.

4. The power supply apparatus according to claim 3, wherein
the electromagnetic wave is transmitted by a radio tag.

5. The power supply apparatus according to claim 4, wherein
the radio tag is located near the power receiving coil.

6. The power supply apparatus according to claim 1, further comprising
a control section which controls to transmit the power based on the signal received by the at least one antenna.

7. The power supply apparatus according to claim 6, wherein
the control section determines the presence or absence of the power receiving coil based on the signal.

8. The power supply apparatus according to claim 1, wherein
the power supply coil is a spiral coil.

9. The power supply apparatus according to claim 6, wherein
the control section permits the power supply coil to transmit power to the power receiving coil when the control section determines the presence of the power receiving coil.

10. The power supply apparatus according to claim 1, further comprising
an electromagnetic wave absorber on an inner wall of the hollow portion of the ring shape of the power supply coil.

11. The power supply apparatus according to claim 1, further comprising
a magnetic body disposed between the power supply coil and the at least one antenna.

12. The power supply apparatus according to claim 1, which faces the power receiving coil mounted in a vehicle, and which supplies power using an electromagnetic force.

13. A power transmitting system comprising a power supply apparatus and a power receiving apparatus,
wherein the power supply apparatus comprises
a power supply coil having a ring shape and configured to transmit power to a power receiving coil located externally; and
at least one antenna configured to receive a signal, wherein
the power supply apparatus transmits the power to the power receiving coil based on the signal received by the at least one antenna,
the at least one antenna overlaps a hollow portion of the ring shape of the power supply coil in a central axis direction of the power supply coil which is controlled to transmit the power based on the signal received by the at least one antenna,
at least a part of the at least one antenna is located out of the hollow portion of the ring shape of the power supply coil which is controlled to transmit the power based on the signal received by the at least one antenna.

14. The power transmitting system according to claim 13, wherein the power receiving apparatus comprises:
a power receiving coil having a ring shape; and
a radio tag disposed inside a hollow portion of the ring shape of the power receiving coil.

15. The power transmitting system according to claim 14, further comprising
an electromagnetic wave absorber on an inner wall of the hollow portion of the ring shape of the power receiving coil.

16. The power transmitting system according to claim 14, wherein,
the at least one antenna is disposed on a central axis of the ring shape of the power supply coil, and
the radio tag is disposed on a central axis of the ring shape of the power receiving coil.

* * * * *